United States Patent [19]

Seikai

[11] Patent Number: 5,671,452
[45] Date of Patent: Sep. 23, 1997

[54] PHOTO FILM AND METHOD OF INSPECTING THE SAME

[75] Inventor: Hiroshi Seikai, Kanagawa, Japan

[73] Assignee: Fuji Photo Film Co., Ltd., Kanagawa, Japan

[21] Appl. No.: 499,903

[22] Filed: Jul. 11, 1995

[30] Foreign Application Priority Data

Jul. 13, 1994 [JP] Japan .................... 6-161281

[51] Int. Cl.$^6$ .................... G03B 27/32; G03B 17/24
[52] U.S. Cl. .................... 396/318; 396/315; 396/567; 355/40
[58] Field of Search .................... 396/310, 311, 396/315, 316, 317, 318, 567, 570; 355/40, 41, 77; 352/235, 236; 430/396

[56] References Cited

U.S. PATENT DOCUMENTS

| | | | |
|---|---|---|---|
| 2,898,805 | 8/1959 | Solow et al. | 352/236 |
| 3,987,467 | 10/1976 | Cowles | 396/318 |
| 4,760,574 | 7/1988 | Budworth et al. | 355/40 |
| 4,800,406 | 1/1989 | Signoretto | 355/40 |
| 4,860,037 | 8/1989 | Harvey | 354/236 |
| 4,918,484 | 4/1990 | Ujiie et al. | 355/41 |
| 4,965,628 | 10/1990 | Olliver et al. | 355/41 |
| 5,006,873 | 4/1991 | Wash | 352/236 |
| 5,128,519 | 7/1992 | Tokuda | 355/41 |
| 5,159,385 | 10/1992 | Imamura | 355/40 |
| 5,164,574 | 11/1992 | Ujiie et al. | 355/41 |
| 5,309,199 | 5/1994 | Frick | 355/41 |
| 5,382,508 | 1/1995 | Ikenoue | 430/396 |
| 5,508,783 | 4/1996 | Iwagaki et al. | 355/41 |

FOREIGN PATENT DOCUMENTS

| | | | |
|---|---|---|---|
| 0105507 | 4/1984 | European Pat. Off. | G03D 15/00 |
| WO91/00547 | 1/1991 | WIPO | G03B 27/52 |

OTHER PUBLICATIONS

Patent Abstracts of Japan, unexamined applications, p field, vol. 18, No. 600, Nov. 15, 1994 The Patent Office Japanese Government, p. 24 P 1826; JP A 06 222 472 (Konica Corporation).

*Primary Examiner*—A. A. Mathews
*Attorney, Agent, or Firm*—Sughrue, Mion, Zinn, Macpeak & Seas, PLLC

[57] ABSTRACT

A photo film has a pair of edge portions (11, 12) extended in a longitudinal direction. Plural image frames (48) are photographable between the edge portions. Plural bodies of photo film information (21, 22) are recorded in at least one of the edge portions photographically in a predetermined arranging pattern (13, 14) in form of latent images. The photo film has a discriminating code (15, 29) associated with the arranging pattern (13, 14) and recorded photographically in a predetermined position.

22 Claims, 3 Drawing Sheets

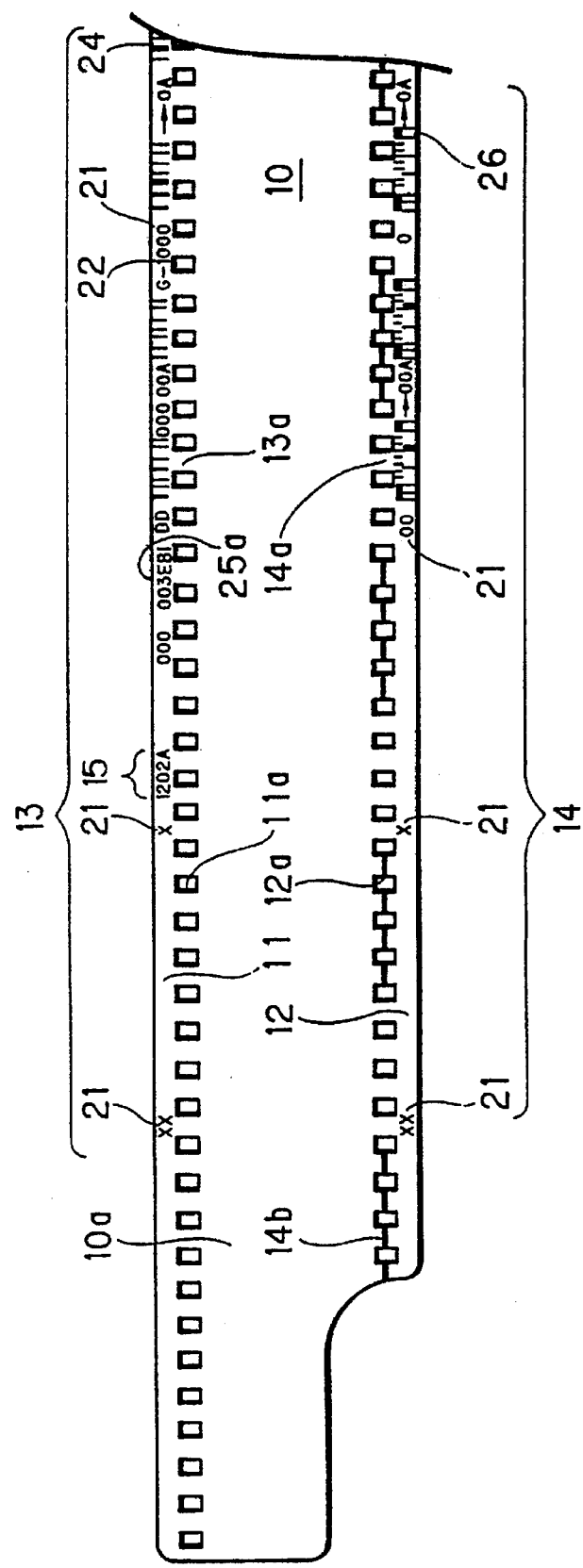

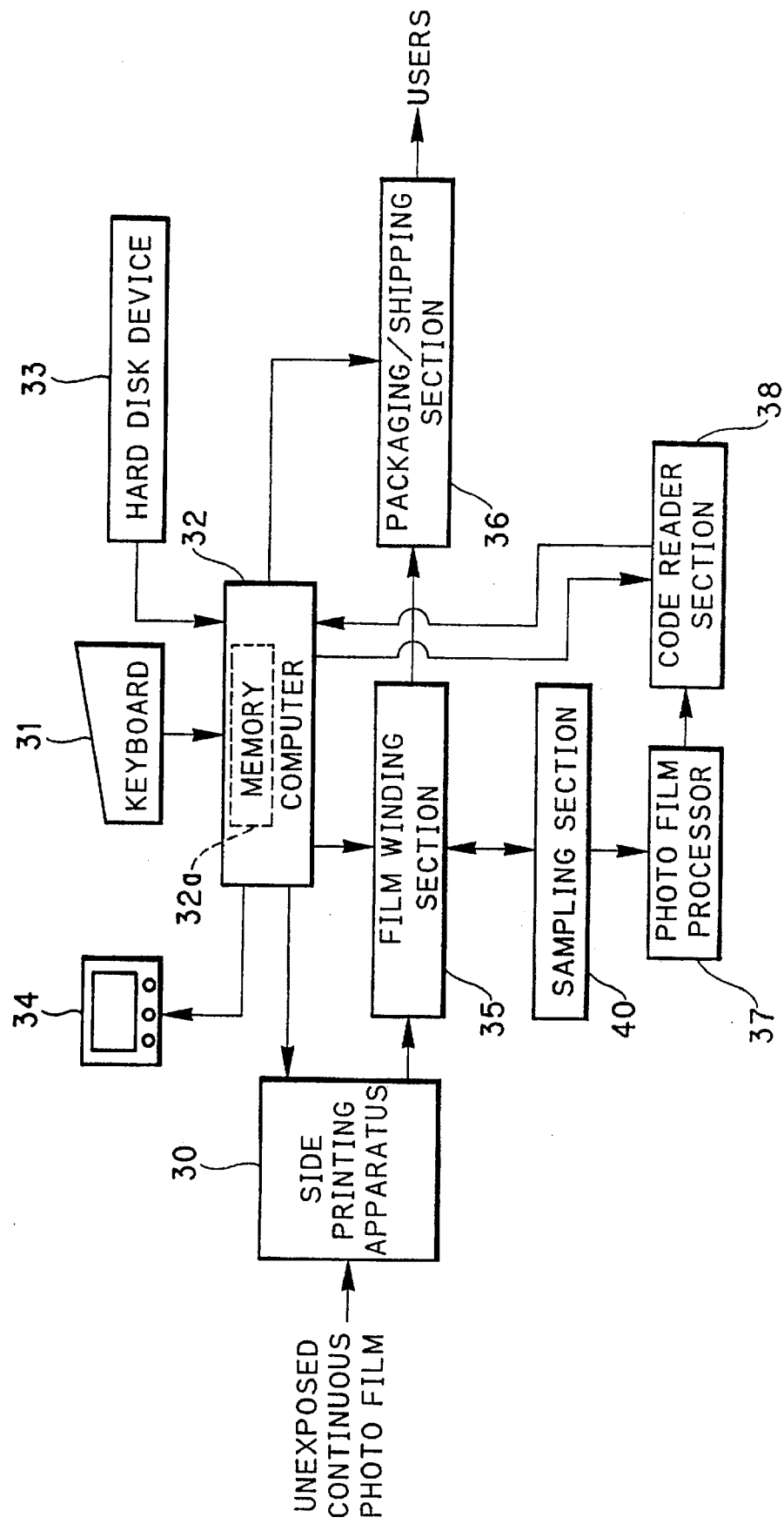

PHOTO FILM AND METHOD OF INSPECTING THE SAME

BACKGROUND OF THE INVENTION

1. Field of the Invention

The present invention relates to a photo film and a method of inspecting the same. More particularly, the present invention relates to a photo film and a method of inspecting the same, in which photo film information photographically recorded on the photo film can be correctly checked.

2. Description Related to the Prior Art

Among various serial steps of manufacturing photo films, there is a process of side printing. In International Publication WO 91/00547 disclosing the side printing process, information inclusive of edge numbers, photo sensitivity and product name is photographically recorded edge portions of the photo film in the form of latent images constituted of numerals, alphabets, signs and bar codes. The various photo film information is rendered visible by development of the photo film, and used for classifying the photo film, and designating frames to be printed in the extra printing.

If the photo film has wrong information recorded, a user or photofinishing agent experiences difficulties. To ship out the photo films as manufactured, some of the photo films in each lot are sampled to inspect the correctness of the photo film information. For the inspection, the sampled photo films are developed, to render the information visible, to compare them with previously prepared reference information through direct observation of an operator.

However there are 50 or more types of photo films, because there are varieties of color or monochromatic, negative or reversal, photo film sensitivity, the maximum available number of frames, product name, and the like. Each type of photo film is provided with photo film information in accordance with a particularly determined arranging pattern. Although there are various arranging patterns, differences between them are extremely minute. Correctness of the arranging pattern cannot be checked by an operator's eye without his time-consuming effort. Any of the arranging patterns cover the whole length of the photo film. There is a problem in that the operator is very likely to miss his inspection of the arranging pattern.

SUMMARY OF THE INVENTION

In view of the foregoing problems, an object of the present invention is to provide a photo film and a method of inspecting the same, in which photo film information photographically recorded on the photo film can be inspected with high level of accuracy and ease.

In order to achieve the above and other objects and advantages of this invention, a photo film has a pair of edge portions extended in a longitudinal direction. Plural image frames are photographable between the edge portions. Plural bodies of photo film information are recorded in at least one of the edge portions photographically in a predetermined arranging pattern in the form of latent images. The photo film includes a discriminating code, associated with the arranging pattern and recorded photographically in a predetermined position.

In a method of inspecting plural photo films of a single type produced in one lot, a first discriminating code is designated in association with the arranging pattern, the first discriminating code being adapted to discriminate the arranging pattern. The first discriminating code is recorded photographically on the photo films in the form of a latent image when the photo film information is recorded. At least one of the photo films included in the one lot is sampled. The sampled photo film is developed at least partially, to render a second discriminating code visible. The second discriminating code is read from the developed sampled photo film. It is checked whether the second discriminating code coincides with the first discriminating code. If the second discriminating code is different from the first discriminating code, then it is judged that the photo films included in the one lot have a wrong arranging pattern. In the present invention, it is possible to inspect photo film information photographically recorded on the photo film with a high level of accuracy and ease.

BRIEF DESCRIPTION OF THE DRAWINGS

The above objects and advantages of the present invention will become more apparent from the following detailed description when read in connection with the accompanying drawings, in which:

FIG. 1A is an explanatory view partially illustrating a photo film, on the side of a leader thereof;

FIG. 2 is a block diagram illustrating a system for inspecting the photo film.

DETAILED DESCRIPTION OF THE PREFERRED EMBODIMENT(S) OF THE PRESENT INVENTION

Figure 1B:
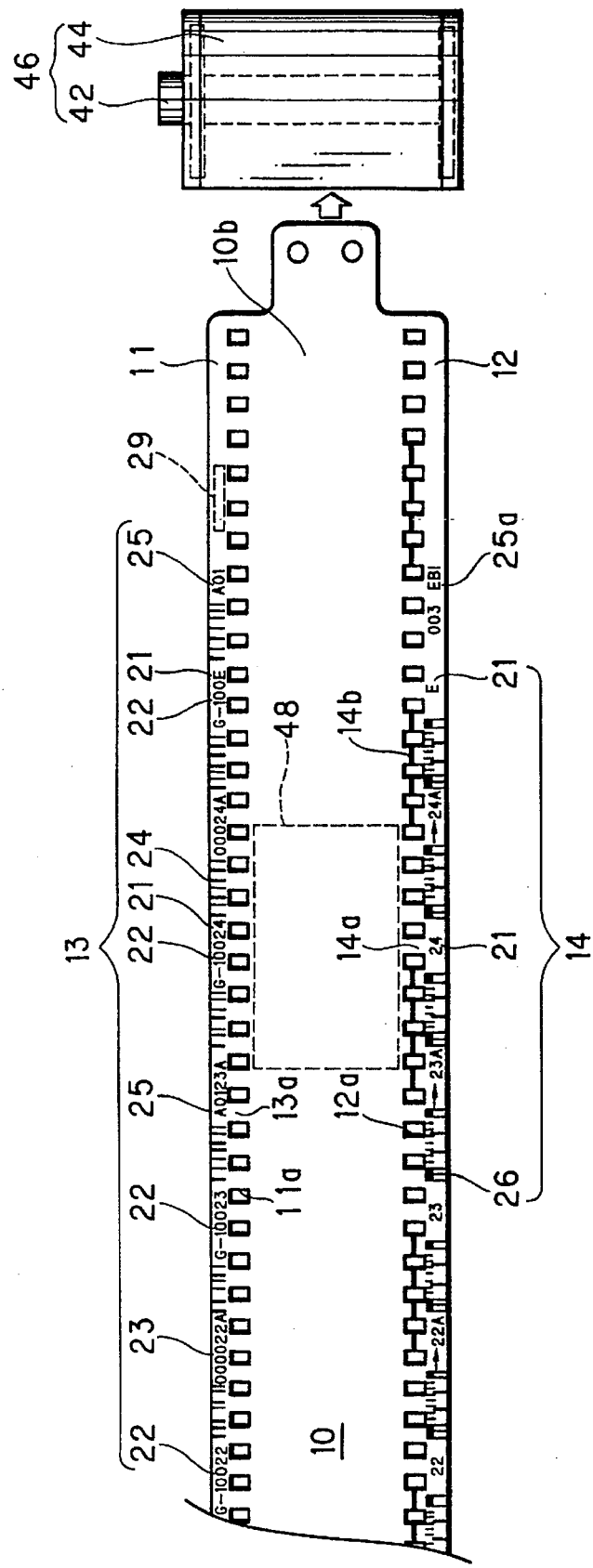
FIG. 1B is an explanatory view partially illustrating the photo film of FIG. 1A, on the side of a trailer thereof.

In FIGS. 1A and 1B, a photo film 10 has edge portions 11 and 12 and two trains of perforations 11a and 12a. The photo film 10 also has photo film information in a predetermined arranging pattern, which includes sub-patterns 13 and 14. Although the sub-patterns 13 and 14 are invisible as latent images before being developed, the photo film 10 is depicted as viewed in a developed state for the convenience in understanding. Reference numerals 13a and 14a designate areas between the perforations 11a and 12a. The areas 14a have a belt 14b later to be described. A leader 10a of the photo film 10 has a pattern discriminating code 15 along the edge portion 11 with the sub-pattern 13. The discriminating code 15, for example "1202A", is determined uniquely for the arranging pattern in combination of the sub-patterns 13 and 14 and the belt 14b. The sub-patterns 13 and 14, the belt 14b and the discriminating code 15 are recorded in the manufacture of the photo film 10 in the form of latent images.

The sub-patterns 13 and 14 include edge numbers 21, a product name 22, a manufacturer name 23, frame number bar codes 24, emulsion number 25, and a DX code 26. The edge numbers 21 are "XX, X, 00, 00A, 0, 0A, 1, 1A, 2, 2A, . . . , 24, 24A, E", for the maximum available number "24" of frames of the photo film 10. Each of the intervals between "XX, X, 00, 0, 1, 2, . . . , 24, E" is as long as a train of eight of the perforations 11a and 12a. An area to the left of the edge number "0" is the leader 10a. An area to the right of the edge number "E" is a trailer 10b. Those two areas are not used for exposures in general. The belt 14b is recorded along the areas 14a, and used for discrimination of the type of the photo film 10 for a photofinishing agent producing prints from the photo film 10.

The product name 22 is, for example, "G-100", of which "100" means ISO 100 as sensitivity of the photo film 10. "G-100" further means that the photo film 10 is color negative film. The manufacturer name 23 includes a certain number of alphabets or other characters. The frame number bar codes 24 represent frame numbers and the like. The emulsion number 25 is, for example, "A01". The DX code 26 is constituted of two tracks, which are clock track and data track extended in parallel. In the data track, a manufacturer, a type and the like of the photo film 10 are encoded and recorded. Identification information 25a is, for example, "003 EB1", which represents a date, a machine and the like of the manufacture of the photo film 10.

The discriminating code 15 is "1202A" in five digits, of which the 1st to 4th digits are numerals and the 5th digit is an alphabet. Those digits have meanings as follows:

1st to 4th digits: product number (1000 or more: color negative, 4000 or more: color reversal, and 7000 or more: monochromatic);

5th digit: additional sign (A-Z) used when the arranging pattern is partially changed.

The pattern discriminating code "1202A" represents that the photo film 10 is a color negative film of which the product number is 1202. The portion "202" in "1202" indicates that the ISO sensitivity is 100 and the number of maximum available frames is 24.

FIG. 2 illustrates a system for inspecting the photo film 10. At first, unexposed continuous photo film is transported into a side printing apparatus 30 as material for the photo film 10. A keyboard 31 is manually operated, to enter the discriminating code 15 (1202A) through it to a computer 32, in association with the type of the photo film 10. The computer 32 reads the sub-patterns 13 and 14 and the belt 14b out of a hard disk device 33 at the address of the discriminating code 15 as entered, and displays the sub-patterns 13 and 14 and the belt 14b in a monitor display device 34. An operator checks the sub-patterns 13 and 14 and the belt 14b through the monitor display device 34, and depresses a start key in the keyboard 31. Responsively the sub-patterns 13 and 14, the belt 14b and the discriminating code 15 are entered to the side printing apparatus 30. In the meantime, the discriminating code 15 is written to a memory 32a in the computer 32.

The side printing apparatus 30 transports the continuous photo film at high speed, and at the same time, records the sub-patterns 13 and 14, the belt 14b and the discriminating code 15 to the edge portions of the photo film 10. For the record, a printing head is used for exposing the photo film 10, and includes a number of light-emitting diodes (LED) of a minute size. The timing of driving the LEDs is controlled according to pulses generated by a rotary encoder incorporated in reels for transporting the continuous photo film.

After the recording of the sub-patterns 13 and 14, the belt 14b and the discriminating code 15, the continuous photo film is cut into strips of the photo film 10 having the predetermined length and shape. The photo film 10 is sent to a film winding section 35, retained on a spool 42 (See FIG. 1B), wound thereabout, and inserted into a cassette body 44, which is closed in light-tight fashion, to produce a photo film cassette 46. The plurality of the photo film cassette 46 as a number of lots are sent to a packaging/shipping section 36 lot after lot. There is connected a sampling section 40, which samples a predetermined number of cassettes from each lot, for example, five cassettes per one lot, and sends them to a photo film processor 37.

The photo film 10 is developed in the photo film processor 37, to render the discriminating code 15 visible. The photo film 10 is sent to a code reader section 38, which is an inspecting machine for checking coincidence of the code, and is connected to the computer 32. The code reader section 38 includes an optical character reader (OCR), reads the discriminating code 15, and sends the data of the discriminating code 15 to the computer 32. The computer 32 judges whether the data as read coincides with the discriminating code 15 stored in the memory 32a, to check the correctness of the sub-patterns 13 and 14 and the belt 14b.

If the data read by the OCR is different from the discriminating code 15 stored in the memory 32a, the photo film 10 has been provided with a wrong arranging pattern of the sub-patterns 13 and 14 and the belt 14b. The one lot including the photo film 10 with the wrong pattern is stopped from being packaged or shipped, and subjected to the total inspection. If the data read by the OCR coincides with the discriminating code 15 stored in the memory 32a, the one lot including the photo film 10 is sent to the packaging/shipping section 36, where photo film cassettes are packaged at a predetermined number as units and shipped to be purchased by users.

In the above embodiment, the discriminating code 15 is recorded to the leader 10a of the photo film 10. It is possible to record a pattern discriminating code 29 to a position in the trailer 10b. The photo film 10 can have only one of, or both of, the discriminating codes 15 and 29. The present invention is also applicable to forms other than those of the above-described arranging pattern and the discriminating code. The discriminating code, instead of "1202A", may be Roman numerals, a bar code, and other signs. The code reader section 38 automatically reads the discriminating code, which, however, may be read by an operator's eye. For the reading of the operator, the discriminating code can be preferably a combination of numerals or signs for convenience, not a bar code.

In the above embodiment, all the photo film information to be recorded is combined in the single arranging pattern, which is represented in a form of the pattern discriminating code. However it is possible that there are plural arranging patterns determined for respective kinds of information, and plural discriminating codes associated with the plural arranging patterns. Those plural discriminating codes can be recorded in different positions, or else in one position in one serially continued form of code. In the embodiment, the photo film is developed for inspection. It is also possible to develop only a part of the photo film 10 with the discriminating code 15: the leader 10a of the photo film 10 as sampled can be cut off from the photo film 10, and developed to visibilize the discriminating code 15.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photo film, having a pair of edge portions extended in a longitudinal direction, wherein plural image frames are photographable between said edge portions, and plural bodies of photo film information are recorded in at least one of said edge portions photographically in a predetermined arranging pattern in the form of latent images, said arranging pattern corresponding to characteristics of said photo film, said photo film comprising:

a pattern discriminating code recorded photographically in a predetermined position, said pattern discriminating code uniquely identifying said arranging pattern used to record said plural bodies of photo film information.

2. A photo film as defined in claim 1, wherein said plural bodies of said photo film information comprise a product sign and frame numbers for discerning said image frames.

3. A photo film as defined in claim 2, wherein said predetermined position is in a leader and/or a trailer which are outside said image frames.

4. A photo film as defined in claim 3, wherein said predetermined position is in either of said edge portions of said leader and/or said trailer.

5. A photo film as defined in claim 3, wherein said product sign represents photo sensitivity, either one status of color film and monochromatic film, and either one status of negative film and reversal film.

6. A photo film as defined in claim 5, wherein said pattern discriminating code includes first to Nth digits each of which has a numeral or an alphabet.

7. A photo film as defined in claim 6, wherein said first digit of said pattern discriminating code represents either one status of color film and monochromatic film, and/or either one status of negative film and reversal film.

8. A photo film as defined in claim 7, wherein second to (N−1)th ones of said digits of said pattern discriminating code represent photo sensitivity, and/or a maximum available number of said image frames.

9. A photo film as defined in claim 8, wherein said Nth digit of said pattern discriminating code has an additional sign used when said arranging pattern is partially changed relative to an arranging pattern normally used with a photo film having the same characteristics as said photo film.

10. A photo film as defined in claim 9, wherein N=5.

11. A photo film as defined in claim 9, wherein said at least one of said edge portions further has:

a DX code which is formed at a regular pitch, and of which at least one portion represents said photo sensitivity and said product sign;

frame number bar codes, respectively disposed beside said frame numbers, for representing an associated one of said frame numbers; and identification information for representing a date or a machine of production, said identification information including a combination of plural numerals and/or alphabets.

12. A photo film as defined in claim 11, wherein said frame numbers further include: serial integers from 0 to $\underline{k}$ where said $\underline{k}$ is said maximum available number of said image frames; XX, X and 00 arranged before said serial integers; and E arranged after said serial integers;

said frame numbers arranged at a regular pitch which is a pitch of creating said image frames.

13. A photo film as defined in claim 12, wherein said edge numbers further include 0A, 1A, 2A, . . . , kA arranged alternately with said serial integers.

14. A method of inspecting plural photo films of a single type produced in one lot, wherein each of said photo films has a pair of edge portions extended in a longitudinal direction, plural image frames are photographable between said edge portions, and plural bodies of photo film information associated with said single type are recorded in at least one of said edge portions photographically in a predetermined arranging pattern in the form of latent images, said photo film inspecting method comprising steps of:

designating a discriminating code in association with said arranging pattern, the discriminating code adapted to discriminate said arranging pattern;

storing the discriminating code in a memory;

recording the discriminating code photographically on said photo films in the form of a latent image when said photo film information is recorded;

sampling at least one of said photo films included in said one lot;

developing said sampled photo film at least partially, to render the discriminating code recorded thereon visible;

reading the discriminating code from said developed sampled photo film; and checking whether the discriminating code read from said developed sample coincides with the discriminating code stored in the memory, wherein, if the discriminating code read from said developed sample is different from the discriminating code stored in the memory, then it is judged that said photo films included in said one lot have a wrong arranging pattern.

15. A photo film inspecting method as defined in claim 14, further comprising the steps of:

storing plural arranging patterns in which plural bodies of said photo film information are arranged;

externally inputting the discriminating code associated with said arranging pattern designated for said one lot, thereby designating the discriminating code;

reading said arranging pattern associated with the discriminating code among said stored plural arranging patterns, thereby designating said arranging pattern;

including said photo film with said photo film information of said arranging pattern and the discriminating code into a cassette body, to produce a photo film cassette; and sampling at least one photo film cassette among photo film cassettes produced in said one lot, to develop said sampled photo film therefrom.

16. A photo film inspecting method as defined in claim 15, wherein said plural bodies of said photo film information comprise said single type of said photo films and frame numbers for discerning said image frames of said photo films.

17. A system for producing plural photo films of a single type produced in one lot, each of said photo films having a pair of edge portions extended in a longitudinal direction, wherein plural image frames are photographable between said edge portions, said photo film producing system comprising:

a code generator device for generating a signal of a first discriminating code, said first discriminating code determined in association with said single type of said photo films;

a pattern memory for storing plural arranging patterns at an address of said first discriminating code, each of said arranging patterns associated with a photo film type, and adapted to arranging plural bodies of photo film information associated with said photo film type, said arranging patterns respectively determined so as to arrange said photo film information in at least one of said edge portions in fashion usable after being developed;

a computer, connected to said code generator device and said pattern memory, for accessing said pattern memory in response to said signal of said first discriminating code, and for reading one of said arranging patterns associated with said first discriminating code;

a side printing apparatus, connected to said computer, and supplied with a signal of said arranging patterns and said signal of said first discriminating code by said computer, for photographically recording said photo film information in said at least one of said edge portions in said read arranging pattern in form of latent images, and for recording said first discriminating code photographically on said photo films in form of a latent image;

a sampling section, connected to said side printing apparatus, for sampling at least one of said photo films included in said one lot;

a photo film processor, connected to said sampling section, and supplied with said sampled photo film, for developing said sampled photo film at least partially, to render a second discriminating code visible; and a code reader, connected to said computer and said photo film processor, for reading said second discriminating code from said developed sampled photo film;

said computer, supplied with information of said second discriminating code by said code reader, and checking whether said second discriminating code coincides with said first discriminating code, wherein, if said second discriminating code is different from said first discriminating code, then it is judged that said photo films included in said one lot have a wrong arranging pattern.

18. A photo film producing system as defined in claim 17, further comprising:

a code memory, connected to said computer, for storing said first discriminating code, said code memory accessed by said computer, and adapted to checking coincidence with said second discriminating code; and a film winding apparatus, connected between said side printing apparatus and said sampling section, for including said photo films from said side printing apparatus respectively into a cassette body to produce a photo film cassette, said sampling section sampling at least one of photo film cassettes produced in said one lot, to develop said sampled photo film therefrom.

19. A photo film producing system as defined in claim 18, wherein said code generator device is externally operated to input said first discriminating code.

20. A photo film producing system as defined in claim 19, wherein said side printing apparatus transports unexposed continuous photo film in recording said latent images photographically;

said film winding device cuts said continuous photo film from side printing apparatus at a predetermined length to produce said photo films, and winds said photo films respectively about a spool before inclusion in said cassette body; and further comprising a packaging section, connected to said film winding apparatus and said computer, and enabled by said computer when said second discriminating code coincides with said first discriminating code, to be supplied with said photo film cassette for packaging said photo film cassette.

21. A photo film producing system as defined in claim 20, further comprising a display device, connected to said computer, for displaying said photo film information arranged in said read arranging pattern, said display device adapted to visually checking said arranging pattern before recording said latent images photographically.

22. A photo film producing system as defined in claim 21, wherein said code reader is an optical character reader.

* * * * *